Sept. 26, 1939.  E. H. LAND  2,174,270
DISPLAY DEVICE EMPLOYING POLARIZED LIGHT
Filed June 1, 1938
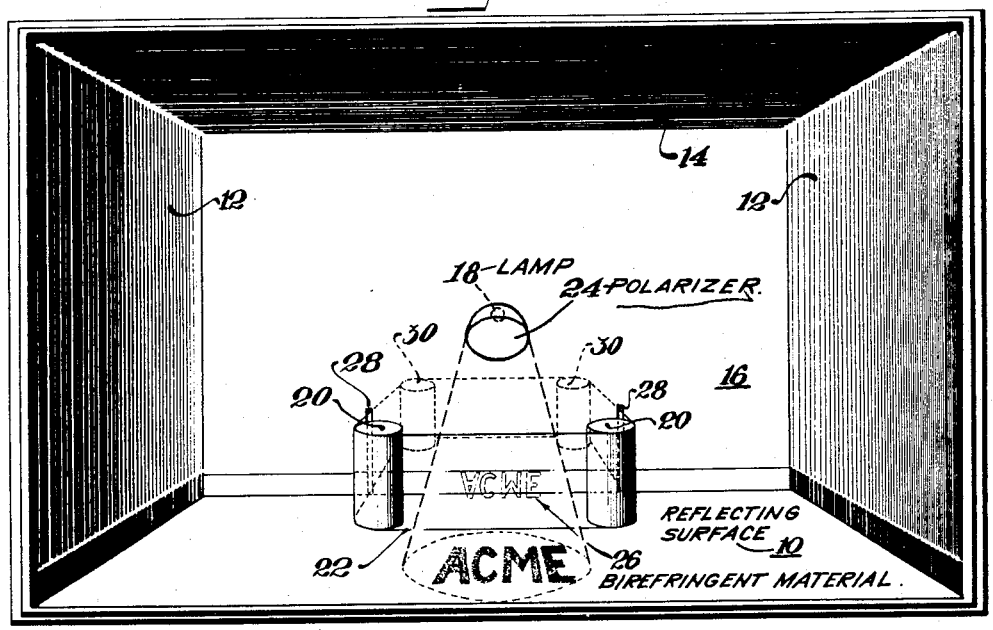
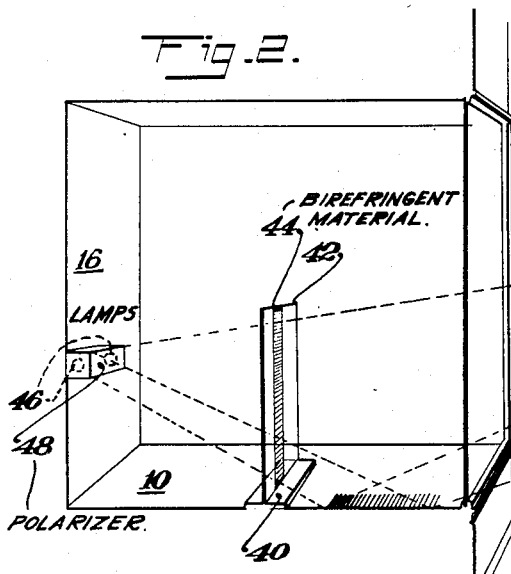
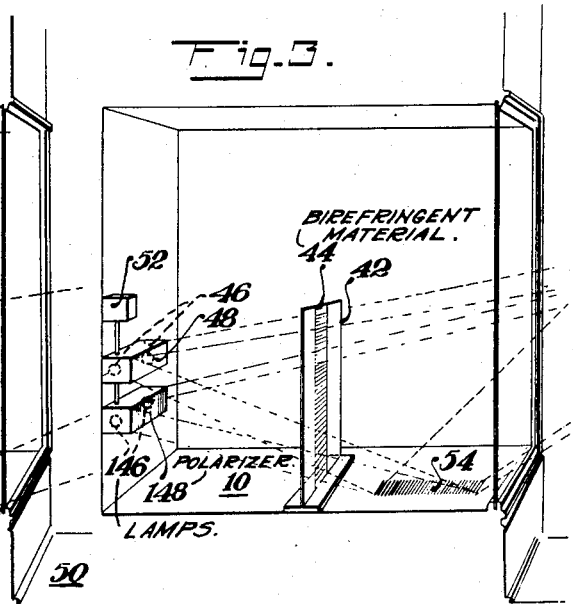
INVENTOR
Edwin H. Land
By Brown & Jones
ATTORNEYS Patented Sept. 26, 1939

2,174,270

UNITED STATES PATENT OFFICE 2,174,270

DISPLAY DEVICE EMPLOYING POLARIZED LIGHT

Edwin H. Land, Wellesley Farms, Mass., assignor, by mesne assignments, to Polaroid Corporation, Dover, Del., a corporation of Delaware Application June 1, 1938, Serial No. 211,179

9 Claims. (Cl. 40—130)

This invention relates to display devices employing polarized light.

Objects of the invention are to provide a display device for producing or exhibiting what are apparently anomalous color effects which may be used as a decoration or advertisement, or as pictorial or intelligence conveying designs in the form of pictures or indicia; to provide a device which throws upon some predetermined surface a colored shadow or design which may be formed by an intervening object even though that object itself does not show that design upon it; to provide a transparent colorless screen which casts colored shadows in polarized light; and to provide such a device using the phenomenon of double refraction.

Other objects of the invention will in part be obvious and will in part appear hereinafter.

The invention accordingly comprises the features of construction, combination of elements, and arrangement of parts which will be exemplified in the construction hereinafter set forth and the scope of the application of which will be indicated in the claims.

For a fuller understanding of the nature and objects of the invention, reference should be had to the following detailed description, taken in connection with the accompanying drawing, which is a somewhat diagrammatic view of a device embodying one form of the invention.

Figure 1 is a perspective view in front elevation of a device embodying one form of the invention;

Fig. 2 is a perspective view in end elevation of a simplified form of the device shown in Fig. 1; and Fig. 3 illustrates a modification of the device shown in Fig. 2.

In the drawing, 10 denotes any surface intended for the reception of the colored designs hereinafter described, and may comprise the floor of a chamber such as the display window of a store. Where the invention is employed with such a chamber there may be provided side walls 12 and a ceiling 14, together with a rear wall 16. A source of light 18 throws a beam onto the surface 10, preferably at angles approximating the polarizing angle. In one form of the invention rotatable supports 20 carry a transparent web 22, which intersects at least a part of the beam from the source 18 incident on the surface 10. A surface 24 of polarized material is positioned over the front of the light source 18 and in a preferred form of the invention it is so positioned that its polarizing axis is either parallel to the plane of the surface 10, or at right angles thereto.

On the web 22 there are provided areas 26 of double refracting material. These areas may be of any design, including letters, numbers, indicia, pictures, geometric shapes, etc. They are preferably so positioned that the direction of vibration of the polarized beam emanating from the source 18 and traversing the areas 26 is at an angle, other than 90°, to a principal optical direction of said areas. The areas may be positioned with their respective corresponding principal optical directions angularly positioned with respect to each other.

The mirror images of the areas 26 will appear on the surface 10 in color and will be visible to one looking into the window. The color will be present even though the areas 26 are transparent and can be observed to be colorless. The reflecting surface 10 acts, in this connection, as an analyzer for the polarized beam, and the action of the birefringent areas 26, in imparting color characteristics to light reflected from the surface 10, is substantially similar to the action of the birefringent areas described in my issued United States Patent No. 2,018,214, dated October 22, 1935, to which reference is made for a further explanation of the phenomenon.

Best results will be obtained if the surface 10 is highly polished and efficiently reflecting, as a mirror surface, for example, or a metallic surface, or a highly polished wood surface. If desired, the efficiency of the surface may be increased by coating it with oriented polarizing material, for example the material sold under the trade name "Polaroid," or any other material providing a polarizing film. So also the effectiveness of the device will be enhanced if the display is so designed that an observer, in normal viewing position, stands with his eyes directly in the beam reflected from the surface 10.

It may be desired to have a succession of designs appear. This may be accomplished by having web 22 wound and unwound on the elements 20, or the web may be passed through the apertures 28 in the rear wall 16 and be carried on pulleys 30 behind that wall, so that the web is in the form of a continuous belt. It is to be understood that the areas 26 need not be movable, but may be fixed, in which case the means for moving the web may be dispensed with.

If desired, the polarizing element 24 may be rotatable or otherwise movable, and means may be provided to effect such rotation or movement of the element, so as to give successive colors in the reflected design.

The source of the color in the floor design will be unknown to an observer although it will be obvious that the design 26, which may be detected from its edges, must have something to do with the color. Whole areas of doubly refracting material may cover complete portions of the web, giving a solid reflected color to so much of the light reflected from the floor as has gone through the web.

Objects may be placed so as to be struck by light which has passed through the web but not through the designs 26, or objects may be so positioned as to intercept light traversing the areas 26 and incident on the objects at angles other than angles approximating the polarizing angle of incidence. These objects will not show color induced by the designs on the web.

Different portions of the design may be of doubly refracting material of different thicknesses. The color on the floor will differ with the thickness of the doubly-refracting material, and with the angle at which the floor design is viewed.

In Fig. 2 there is shown a modified form of apparatus comprising a store window with a reflecting floor 10 and rear wall 16. A support 40 carries a transparent element 42, which may be of glass, on which is positioned a strip 44 of doubly-refracting material. Behind the glass 42 and conveniently against the back wall 16, there is a source of light 46 having a polarizing material 48 across the front thereof. The light 46 is visible through the glass 42 by an observer on the sidewalk 50. Light 46 is positioned so as to shine through glass 42 and strip 44 on the floor 10 at angles approximating, preferably, the polarizing angle of incidence.

An observer will see no color in the light source 46 and yet he does observe color on the floor 10 where beams from the source 46 strike the floor.

In Fig. 3, there is shown a similar arrangement with the exception that there is a second light source 146 provided adjacent the source 46. The polarizing material 148 on the front thereof is positioned with its polarizing axis at an angle, preferably at right angles, to the axis of the material 48. The lights are caused to alternate by a mechanism, such as a flasher mechanism, shown generally in the box 52. As they alternate, an observer will see different colors appear at position 54 on the floor 10 although the lights, as seen directly through elements 42 and 44, are white.

It will be obvious that there are numberless interesting arrangements and rearrangements employing the ideas described above.

Since certain changes may be made in the above construction and different embodiments of the invention could be made without departing from the scope thereof, it is intended that all matter contained in the above description or shown in the accompanying drawing shall be interpreted as illustrative and not in a limiting sense.

It is also to be understood that the following claims are intended to cover all the generic and specific features of the invention herein described, and all statements of the scope of the invention which, as a matter of language, might be said to fall therebetween.

Having described my invention, what I claim as new and desire to secure by Letters Patent is:

1. In combination, means providing a reflecting surface, means providing a beam of polarized light incident on said surface at angles approximating the polarizing angle of incidence, and doubly refracting means interposed in the path of said beam and between the light source and said surface, and having a principal optical direction non-parallel to the direction of vibration of said beam.

2. In combination, means providing a reflecting surface, means providing a beam of polarized light incident on said surface at angles approximating the polarizing angle of incidence, doubly refracting means interposed in the path of said beam and between the light source and said surface, and having a principal optical direction non-parallel to the direction of vibration of said beam, and means to move said doubly refracting means across said beam.

3. In combination, means providing a reflecting surface, means providing a beam of polarized light incident on said surface at angles approximating the polarizing angle of incidence, doubly refracting means interposed in the path of said beam and between the light source and said surface, and having a principal optical direction non-parallel to the direction of vibration of said beam, and means to alter the direction of vibration of the beam emanating from said source before it is incident on said birefringent means.

4. In combination, means providing a reflecting surface, means providing a beam of polarized light incident on said surface at angles approximating the polarizing angle of incidence, and doubly refracting means interposed in the path of said beam and between the light source and said surface, and having a principal optical direction non-parallel to the direction of vibration of said beam, said birefringent means being shaped to form a design intercepting a portion only of said beam.

5. In combination, a source of polarized light, birefringent means interposed in the path of the beam emanating from said source, and a light-reflecting surface interposed in the path of so much of said beam as traverses said birefringent means, said birefringent means and said surface being so positioned with respect to the direction of vibration of said beam that colored images of said birefringent means are formed on said surface.

6. In combination, a source of polarized light, birefringent means interposed in the path of the beam emanating from said source, and a light-reflecting surface interposed in the path of so much of said beam as traverses said birefringent means, said birefringent means and said surface being so positioned with respect to the direction of vibration of said beam that colored images of said birefringent means are formed on said surface, said birefringent means comprising areas forming a predetermined design comprising less than the entire area of said beam incident on said surface.

7. A display device comprising, in combination, a light source adapted to project a beam of polarized light, transparent means comprising a birefringent area interposed in the path of said beam, said light source being so positioned that a portion of the beam traversing said birefringent area is incident upon a light-reflecting surface at angles approximately the polarizing angle of incidence, and a further portion of said beam traversing said birefringent area is directly incident upon the eyes of an observer positioned in normal viewing relation to said display.

8. A display device comprising, in combination, a light source adapted to project a beam of polarized light, transparent means comprising a birefringent area interposed in the path of said beam, said light source being so positioned that a portion of the beam traversing said birefringent area is incident upon a light-reflecting surface at angles approximating the polarizing angle of incidence, and a further portion of said beam traversing said birefringent area is directly incident upon the eyes of an observer positioned in normal viewing relation to said display, and means to alter the direction of vibration of light emanating from said source.

9. Means for forming on a reflecting-surface colored images comprising a source of polarized light positioned to illuminate said surface, and colorless birefringent means interposed between said surface and said light source and intercepting the beam emitted from said source, said surface being so positioned with respect to said source as to absorb a predetermined portion of the polarized light incident thereon.

EDWIN H. LAND.